(12) United States Patent
Manners et al.

(10) Patent No.: US 6,361,869 B1
(45) Date of Patent: Mar. 26, 2002

(54) MATERIALS AND METHOD OF CHARGE DISSIPATION IN SPACE VEHICLES

(76) Inventors: Ian Manners, 2142 Margot Street, Oakville, Ontario (CA), L6H 3M1; Keith G. Balmain, Apt 1904, 44 Jackes Avenue, Toronto, Ontario (CA), M4T 1E5; Charles H. Hersom, Unit 1513, 2285, Lakeshore Blvd., West, Toronto Ontario (CA), M8V 3X9

( * ) Notice: Subject to any disclaimer, the term of this patent is extended or adjusted under 35 U.S.C. 154(b) by 0 days.

(21) Appl. No.: 09/425,176

(22) Filed: Oct. 22, 1999

Related U.S. Application Data
(60) Provisional application No. 60/105,391, filed on Oct. 23, 1998.

(51) Int. Cl.$^7$ ............................................. B32B 15/04
(52) U.S. Cl. ...................... 428/447; 428/450; 428/457; 528/9; 252/519.2; 252/519.21; 427/77; 427/126.1; 244/1 A; 244/1 R
(58) Field of Search .............................. 528/9; 428/447, 428/450, 457, 519.2; 252/519.21; 244/1 R, 1 A; 427/77, 126.1

(56) References Cited

U.S. PATENT DOCUMENTS

| | | | | |
|---|---|---|---|---|
| 3,847,871 A | * | 11/1974 | Stephens et al. | 260/63 BB |
| 4,705,646 A | * | 11/1987 | DuPont et al. | 252/511 |
| 4,873,304 A | * | 10/1989 | Rosenblum | 528/9 |
| 4,910,050 A | * | 3/1990 | Oldham et al. | 427/386 |
| 5,770,269 A | * | 6/1998 | Long et al. | 427/387 |
| 6,037,091 A | * | 3/2000 | MacLeod et al. | 430/106.6 |

\* cited by examiner

*Primary Examiner*—Margaret G. Moore
(74) *Attorney, Agent, or Firm*—Lynn C. Schumacher; Hill & Schumacher

(57) ABSTRACT

The present invention provides a method and materials for reducing or limiting charge accumulation and the resulting arc discharges in components used in space vehicles such as satellites prone to charge buildup due to exposure to a charge flux. The material is found in the poly(metallocene) family. In each member of this family, a metal atom is an integral part of the polymer chain, the whole structure being held together (and the interactions provided) by chemical bonds rather than by the proximity of the components in a heterogeneous mechanical mixture. In a homogeneous dielectric, the needed conductivity may be radiation-induced or it may be achieved as the result of doping. The components may be coated with, or alternatively fabricated from, a material including the poly(metallocene) as a constituent.

26 Claims, 1 Drawing Sheet

US 6,361,869 B1

MATERIALS AND METHOD OF CHARGE DISSIPATION IN SPACE VEHICLES

CROSS REFERENCE TO RELATED U.S. PATENT APPLICATION

This patent application relates to U.S. provisional patent application Ser. No. 60/105,391 filed on Oct. 23, 1998, entitled MATERIALS AND METHOD OF CHARGE DISSIPATION IN SPACECRAFT.

FIELD OF THE INVENTION

The present invention relates to methods of protecting space vehicles and from charge accumulation and arc discharging. More particularly the invention relates to charge dissipation materials for coating, or producing, components used in space vehicles for limiting charge accumulation and arc discharging.

BACKGROUND OF THE INVENTION

Spacecraft in orbit around the Earth are immersed in streams of energetic electrons which are components of the "solar wind" emanating from the sun's surface. These electron streams constitute electrical currents which are sometimes strong enough to perturb the Earth's magnetic field, events which are thus known as "magnetic storms". Further, these streams of energetic electrons not only sweep past the earth but also are partly trapped In the well-known Van Allen radiation belts which rather inconveniently are concentrated at altitudes much in use by civilian and military communication satellites.

Satellites make extensive use of dielectric materials (mainly polymers). These materials are used on the outside of satellites as "thermal blankets" to limit extremes of temperature, and on the inside as circuit boards and cable insulation. Such polymers are generally very good insulators, so that any injected electrons embedded in them are not quickly conducted away and charge buildup can occur, especially under the magnetic storm conditions described above.

Specifically, dielectric materials such as Mylar, Teflon and Kapton are widely used on spacecraft for thermal control purposes, for example in multilayer thermal blankets and second-surface mirrors. They are also very good electrical insulators, a property that greatly increases the range of their applications to antenna components, antenna covers, single-layer and multilayer circuit boards, integrated circuits, monolithic microwave integrated circuits, cables, solar cells, and supports for solar cell arrays. Unfortunately, this same electrical-insulator property also makes possible the long-term accumulation of electrical charge deposited inside the dielectric by the naturally occurring and deeply penetrating energetic electrons that are especially numerous at altitudes of a few earth radii, altitudes much in use for communications satellites.

If electrical charge accumulates in sufficient quantity, laboratory experiments have shown that the resulting electric field strength can exceed the breakdown level for the material, resulting in high-current electrical discharges which often produce physical damage in the form of microscopic grooves, tunnels and eruptions with signs of local melting. The result of this type of event is primarily the deposition of contaminants over the satellite, the degradation of thermal control material, and the generation of electromagnetic interference that can induce temporary and sometimes permanent failure of electronic circuits.

In principle, charge accumulation and the resulting discharges could be eliminated if the dielectric material had just enough conductivity to drain off the charge faster than it accumulates. Because the incident electron flux is small, the conductivity need not be large, which suggests that the required conductivity could be achieved by mixing in a small fraction of finely ground conducting powder (such as carbon) while the dielectric is in its formative state. However, this solution to the problem requires a significant fraction of the conductive additive in the material since contact among the additive granules is necessary to produce conductivity. With this much additive, there may be degradation in other respects such as thermal properties, mechanical properties, microwave and optical transparency, atomic oxygen erosion, and ultraviolet decomposition. Issues such as these motivate the search for a homogeneous dielectric that acquires conductivity not from being a mixture but rather from its basic electrochemical characteristics.

It would be very advantageous to provide materials either for coating or fabricating various components used in spacecraft and satellites or other applications involving components exposed to charge fluxes for limiting charge accumulation and arc discharging.

SUMMARY OF THE INVENTION

It is an object of the present invention to provide a method and materials for reducing or limiting charge accumulation and the resulting arc discharges in space vehicle or other electronic components prone to charge buildup due to exposure to a charge flux.

In one aspect of the invention there is provided a method of limiting charge accumulation and arc discharging in components exposed to charge fluxes. The method comprises coating the component with a material comprising an effective poly(metallocene).

In this aspect of the invention the poly(metallocene) may include a metallocene unit selected from the group consisting of ferrocene, cobaltocene and ruthenocene.

In this aspect the poly(metallocene) may be a poly (ferrocenylsilane) $[Fe(C_5H_4)_2SiRR']_n$, wherein R and R' are selected from the group consisting of hydrogen, halogen, short or long chain linear or branched alkyl, cycloalkyl, aryl, aryloxy, alkoxy and amino groups and combinations thereof.

The poly(ferrocenylsilane) may be poly (methylphenylferrocenylsilane) or poly (ferrocenyldimethylsilane).

In another aspect of the invention there is provided a method of charge dissipation in selected components of a space vehicle, comprising:

coating selected components of a space vehicle with a polyferrocene comprising fc-SiRR', wherein fc is a ferrocene unit $C_5Z_4FeC_5Z_4$, and wherein R and R' are selected from the group consisting of hydrogen, halogen, short or long chain linear or branched alkyl, cycloalkyl, aryl, aryloxy, alkoxy and amino groups and combinations thereof.

In this aspect of the invention Z may be hydrogen.

In another aspect of the invention there is provided a composite dielectric material comprising at least one constituent being an effective poly(metallocene).

In this aspect of the invention the poly(metallocene) may include a metallocene unit selected from the group consisting of ferrocene, cobaltocene and ruthenocene.

In this aspect of the invention the poly(metallocene) may be a poly(ferrocenylsilane) $[Fe(C_5H_4)_2SiRR']_n$, wherein R and R' are selected from the group consisting of hydrogen, halogen, short or long chain linear or branched alkyl, cycloalkyl, aryl, aryloxy, alkoxy and amino groups and combinations thereof.

In this aspect of the invention at least one of the other constituents of the dielectric material is a polymer such that the dielectric material is a polymer blend.

In another aspect of the present invention there is provided a method of charge dissipation in selected components of a space vehicle, comprising:

producing selected dielectric components of a space vehicle from a composite material, the composite material including an effective poly(metallocene).

In this aspect of the invention the poly(metallocene) includes a metallocene unit selected from the group consisting of ferrocene, cobaltocene and ruthenocene.

In this aspect of the invention the poly(metallocene) is a poly(ferrocenylsilane) $[Fe(C_5H_4)_2SiRR']_n$, wherein R and R' are selected from the group consisting of hydrogen, halogen, short or long chain linear or branched alkyl, cycloalkyl, aryl, aryloxy, alkoxy and amino groups and combinations thereof.

BRIEF DESCRIPTION OF THE DRAWINGS

The method and materials used for protecting satellite and spacecraft components from charge accumulation and arc discharging in accordance with the present invention, will now be described, by way of example only, reference being had to the accompanying drawings, in which.

DETAILED DESCRIPTION OF THE INVENTION

Figure 1:
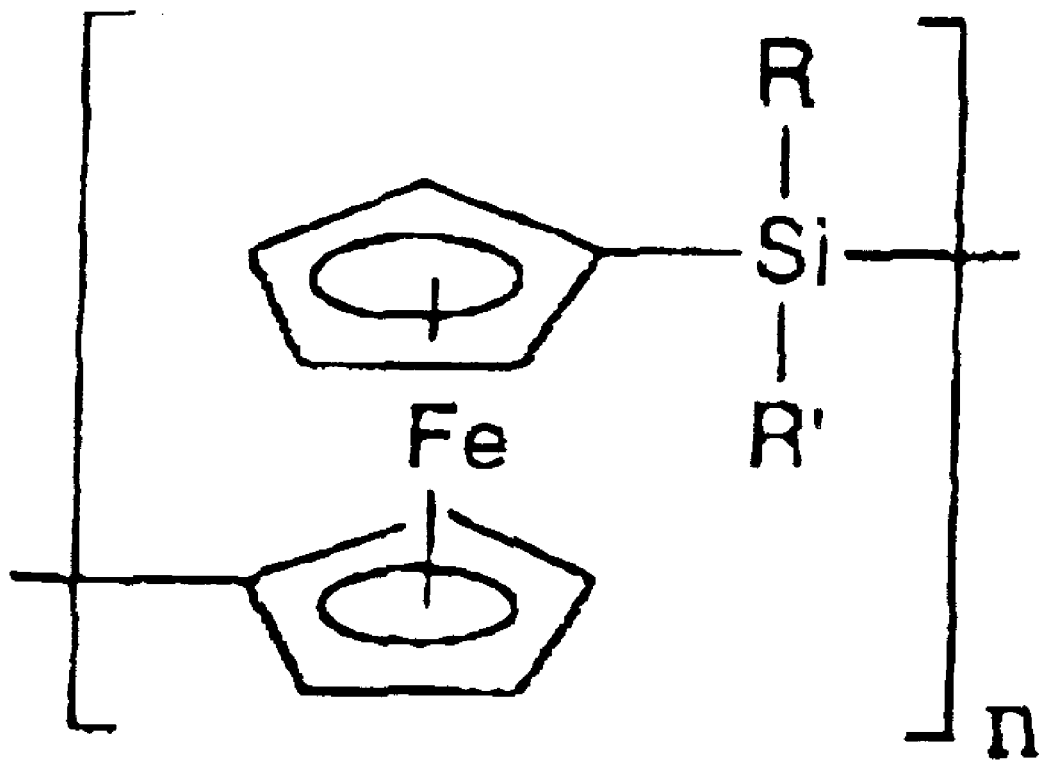
FIG. 1 shows the formula of a basic polymer unit for the poly(ferrocenylsilane) polymer.

The present invention provides a class of materials for reducing or limiting charge accumulation and the resulting arc discharges for use as coatings or for producing components for satellites, spacecraft or other devices or components for the electronics industry prone to charge buildup due to exposure to a charge flux. The class of materials comprises the poly(metallocene) family. In each member of this family, a metal atom is an integral part of the polymer chain, the whole structure being held together (and the interactions provided) by chemical bonds rather than by the proximity of the components in a heterogeneous mechanical mixture. In a homogeneous dielectric, the needed conductivity may be radiation-induced or it may be achieved as the result of doping.

A ring-opening polymerization route to high molecular weight poly(ferrocenes) (I. Manners et al., J. Am. Chem. Soc. 1992, p. 6246) makes available for the first time high molecular weight (Mw>105), soluble, and processable polymers with metal atoms in the backbone which interact with one another. For example, polymers such as poly (ferrocenylsilanes) $[Fe(C_5H_4)_2SiR_2]_n$ are now readily accessible. Moreover, other polymers with different spacer atoms are also available and this allows the metal-metal interaction and hence the electronic properties to be tuned. The materials are insulating when pristine but are semiconductors upon doping.

Since poly(metallocene) molecules have metal atoms integrated into the polymer backbone, a variety of electrical conduction mechanisms could come into play to limit the threat of charge accumulation caused by the incidence of energetic electrons, while at the same time the good insulating properties of the polymers would allow them to function normally in the roles for which they were intended.

The following non-limiting examples are provided solely for the purpose of illustrating the present invention and in no way are to be interpreted in any manner that may restrict the scope of the present invention.

EXAMPLE 1

The material selected for investigation is iron-based, thus termed a poly(ferrocene). More precisely, the poly (ferrocenylsilanes) were studied, particularly poly (methylphenylferrocenylsilane) produced using the basic polymer unit shown in FIG. 1 where R=R'=Me. In the present instance, it is tested in its pristine state, but it is known to exhibit conductivity when doped with iodine. In the experiments to be described, it is In the form of a coating 10 to 30 microns thick, on the surface of a sheet of Mylar which is 50 microns thick. The coated Mylar was laid Mylar-sidedown on a copper substrate and covered with a copper mask having a circular aperture. A 20 keV electron beam was incident normally on that part of the coated Mylar under the mask aperture The stopping distance of the electrons is expected to be a few microns, certainly less than 10 microns, so none of the electrons should penetrate through the poly(ferrocene) coating into the Mylar. An array of Faraday cups enables measurement of the incident electron current density (in the range of 1–10 nA/sq cm) and the distribution of current density over the test specimen.

Studies were carried out using a charge coupled device (CCD) camera to record images of the arc discharges, the camera being pointed normally at the surface of the coated Mylar. In addition, a 2-ohm resistor between the substrate and ground and connected to an oscilloscope provided a means to record the waveform of the discharge current to the copper substrate.

With a coating thickness of 30 microns, over the full range of current densities, and for 1 hour exposure at each current density, no discharges were observed. For comparison, bare Mylar exposed at 1 nA/sq cm produced 2–3 discharges per hour, with proportionately more at higher current densities. The discharge peak currents and durations were as expected from past experience.

A more rigorous test was deemed necessary, and the most rigorous was postulated to involve triggering by an adjacent discharge. This was set up by cutting a test specimen in half, flipping over half of it with the coated side down, and arranging it so that the two cut edges were just touching. This worked as expected, with discharges on the uncoated Mylar occurring frequently and occasionally triggering (or inducing) discharges on the coated Mylar. Different separations between the cut halves were studied (zero to 1.5 mm) with no discernible influence on the results. For the 30 micron coating, only one small induced discharge was observed, and that for an incident current density of 5 nA/sq cm which is generally thought to be 5–10 times higher than a realistic absolute maximum value applicable to synchronous orbit. For a 15 micron coating and a current density of 2.5 nA/sq cm, no induced discharges were observed. For a 10 micron coating, at 1 and 2.5 nA/sq cm, several discharges were observed: they were medium-sized, and none reached the mask edge.

For coating thicknesses of at least 15 microns and current densities at all close to being realistic absolute maximum values, it is safe to say that no discharges were observed indicating that the poly(ferrocene) material, from an electrical point of view, exhibits utility for spacecraft applications aimed at reducing or even eliminating discharge occurrence. Various components for example of a satellite may be coated with, or alternatively, in the case of polymer based materials, may be fabricated from the poly(metallocene) materials.

EXAMPLE 2

For comparison, the charge dissipation properties of a more crystalline polyferrocene of different structure, poly (ferrocenyldimethylsilane), were investigated under analogous conditions. When a device comprised of a 15 $\mu$m thick coating of poly(ferrocenyldimethylsilane) on a 50 $\mu$m Mylar substrate was subjected to a 20 Kev electron beam at current densities of 1, 2.5 and 5 na·cm$^{-2}$ no discharges were apparent after 1 h of exposure at each current density. In order to investigate the dependence of film thickness on the charge dissipating properties, devices comprising a 5 $\mu$m coating of poly(ferrocenyldimethylsilane) supported on a 50 $\mu$m Mylar substrate were also investigated. While no discharging was apparent at current densities of 1 na·cm$^{-2}$ after 1 h of exposure, discharges were observed at current densities of 2.5 and 5 na·cm$^{-2}$ clearly the coated discharge frequency depends greatly on the thickness of the coating. This is consistent with the fact that a 20 Kev electron beam is known to penetrate materials by ca. 10 $\mu$m.

When devices having a 15 $\mu$m thick coating of poly (ferrocenyldimethylsilane) were cut in half and one of the halves inverted to expose the underlying Mylar substrate to an electron flux, discharges were observed consistently on both the coated and uncoated halves. However, as noted above in the case of poly(ferrocanymethylphenylsilane), where discharges were observed on the half with the exposed poly(ferrocene) coating, the discharge tracks appeared to have originated on the Mylar half or at the splicing junction.

Therefore, this invention provides a method of limiting charge accumulation and arc discharging in components exposed to charge fluxes. The method comprises coating the component with a material comprising an effective poly (metallocane). The poly(metallocene) may include a metallocene unit selected from the group consisting of ferrocene, cobaltocene and ruthenocene with the ferrocenes being preferred so that the poly(metallocene) is preferably a poly (ferrocenylsilane) [Fe(C$_5$H$_4$)$_2$SiRR']$_n$, wherein R and R' are selected from the group consisting of hydrogen, halogen, short or long chain linear or branched alkyl, cycloalkyl, aryl, aryloxy, alkoxy and amino groups and combinations thereof.

Those skilled in the art will understand that in addition to using poly(metallocenes) to a coat parts or components prone to suffering from charge buildup, the components themselves may be produced using the poly(metallocenes), undoped or doped as required. Dielectric components may be produced from a composite material including as one constituent the poly(metallocenes). The composite would be a blend when one or more of the other constituents is a polymer. In addition to producing dielectric components for space vehicles such as spacecraft and satellites, any other dielectric components in the electronics industry which may be exposed to charge fluxes may be produced in accordance with the invention disclosed herein.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of limiting charge accumulation and arc discharging in components exposed to charge fluxes, comprising:
   coating the component with a material comprising an effective poly(metallocene).

2. The method according to claim 1 wherein said poly (metallocene) includes a metallocane unit selected from the group consisting of ferrocene, cobaltocene and ruthenocene.

3. The method according to claim 1 wherein the poly (metallocene) is a poly(ferrocenylsilane) [Fe(C$_5$H$_4$)$_2$SiRR']$_n$, wherein n is a positive integer, and wherein R and R' are selected from the group consisting of hydrogen, halogen, short, long chain linear and branched alkyl, cycloalkyl, aryl, aryloxy, alkoxy and amino groups and combinations thereof.

4. The method according to claim 3 wherein the poly (ferrocenylsilane) is poly(methylphenylferrocenylsilane).

5. The method according to claim 3 wherein the poly (ferrocenylsilane) is poly(ferrocenyldimethylsilane).

6. The method according to claim 1 wherein said poly (metallocene) comprises [mc-ER$_x$)$_y$]$_n$, wherein mc is an effective metallocene unit, ER$_x$ is a molecular functional group linking said metallocene units, n is a positive integer, E is selected from the group consisting of B, N, O, Si, Ge, Sn, P, As, S and Se atoms, y$\geq$1, 0$\leq$x$\leq$3, and wherein R is selected from the group consisting of hydrogen, halogen, short, long chain linear and branched alkyl, cycloalkyl, aryl, aryloxy, alkoxy and amino groups and combinations thereof.

7. The method according to claim 6 wherein said metallocene unit is selected from the group consisting of ferrocene, cobaltocene and ruthenocene.

8. The method according to claim 1 wherein the components are components of a space vehicle.

9. The method according to claim 3 wherein the components are components of a space vehicle.

10. A method of charge dissipation in selected components of a space vehicle, comprising:
    coating selected components of a space vehicle with a polyferrocene comprising fc-SiRR', wherein fc is a ferrocene unit C$_5$H$_4$FeC$_5$H$_4$, and wherein R and R' are selected from the group consisting of hydrogen, halogen, short, long chain linear and branched alkyl, cycloalkyl, aryl, aryloxy, alkoxy and amino groups and combinations thereof.

11. A composite dielectric material comprising at least one constituent being a poly(metallocene) which is effective for limiting charge accumulation and arc discharging in said composite dielectric material.

12. The composite dielectric material according to claim 11 wherein said poly(metallocene) includes a metallocene unit selected from the group consisting of ferrocene, cobaltocene and ruthenocene.

13. The composite dielectric material according to claim 12 wherein the poly(metallocene) is a poly(ferrocenylsilane) [Fe(C$_5$H$_4$)$_2$SiRR']$_n$, wherein n is a positive integer, and wherein R and R' are selected from the group consisting of hydrogen, halogen, short, long chain linear and branched alkyl, cycloalkyl, aryl, aryloxy, alkoxy and amino groups and combinations thereof.

14. The composite dielectric material according to claim 13 wherein at least one of the other constituents of the dielectric material is a polymer such that the dielectric material is a polymer blend.

15. The composite dielectric material according to claim 13 wherein the poly(ferrocenylsilane) is poly(methylphenylferrocenylsilane).

16. The composite dielectric material according to claim 14 wherein the poly(ferrocenylsilane) is poly(methylphenylferrocenylsilane).

17. The composite dielectric material according to claim 13 wherein the poly(ferrocenylsilane) is poly(ferrocenyldimethylsilane).

18. The composite dielectric material according to claim 14 wherein the poly(ferrocenylsilane) is poly(ferrocenyldimethylsilane).

19. A method of limiting charge accumulation and charge dissipation in selected components of a space vehicle, comprising:

producing selected dielectric components of a space vehicle from a composite material, the composite material including a poly(metallocene) which is effective for limiting charge accumulation and charge dissipation in the selected dielectric components.

20. The method according to claim 19 wherein said poly(metallocene) includes a metallocene unit selected from the group consisting of ferrocene, cobaltocene and ruthenocene.

21. The method according to claim 20 wherein the poly(metallocene) is a poly(ferrocenylsilane) $[Fe(C_5H_4)_2 SiRR']_n$, wherein n is a positive integer, and wherein R and R' are selected from the group consisting of hydrogen, halogen, short, long chain linear and branched alkyl, cycloalkyl, aryl, aryloxy, alkoxy and amino groups and combinations thereof.

22. The method according to claim 21 wherein at least some of the other constituents of the dielectric material are polymers such that the dielectric material is a polymer blend.

23. The method according to claim 21 wherein the poly(ferrocenylsilane) is poly(methylphenylferrocenylsilane).

24. The method according to claim 22 wherein the poly(ferrocenylsilane) is poly(methylphenylferrocenylsilane).

25. The method according to claim 21 wherein the poly(ferrocenylsilane) is poly(ferrocenyldimethylsilane).

26. The method according to claim 22 wherein the poly(ferrocenylsilane) is poly(ferrocenyldimethylsilane).

* * * * *

UNITED STATES PATENT AND TRADEMARK OFFICE
CERTIFICATE OF CORRECTION

PATENT NO. : 6,361,869 B1  
DATED : March 26, 2002  
INVENTOR(S) : Manners et al.

It is certified that error appears in the above-identified patent and that said Letters Patent is hereby corrected as shown below:

<u>Title page,</u>  
Item [73], Assignees: should read -- Ian Manners  
Oakville (CA)  
Keith Balmain  
Toronto (CA)  
Centre for Research in Earth and Space Technology  
North York (CA) --

Signed and Sealed this

Twenty-fourth Day of September, 2002

Attest:

Attesting Officer

JAMES E. ROGAN  
*Director of the United States Patent and Trademark Office*